A. G. HELFER.
AUTOMATIC SPEED CONTROL FOR VEHICLES.
APPLICATION FILED SEPT. 12, 1913.
1,138,560.
Patented May 4, 1915.
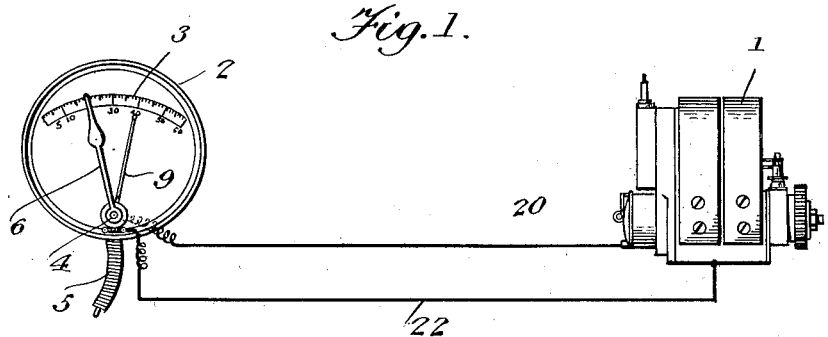
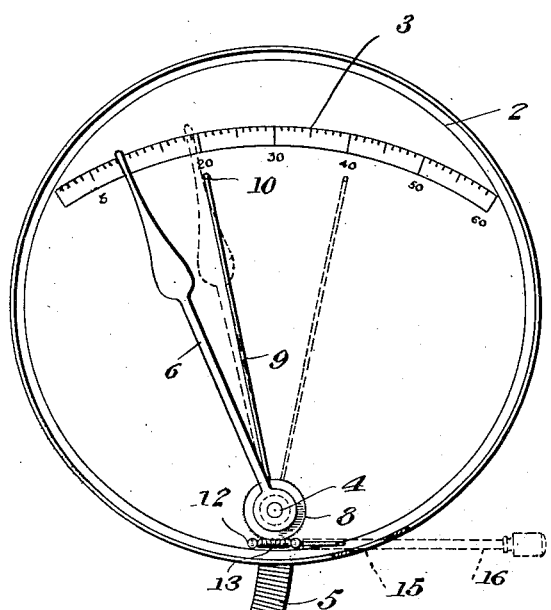
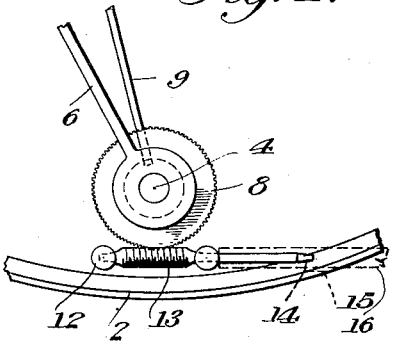
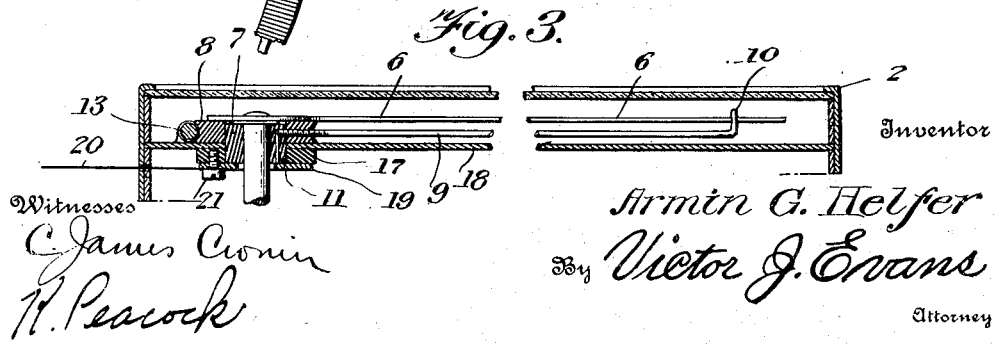
Inventor
Armin G. Helfer
By Victor J. Evans
Attorney
Witnesses
C. James Cronin
R. Peacock

UNITED STATES PATENT OFFICE.

ARMIN G. HELFER, OF NEW YORK, N. Y.

AUTOMATIC SPEED CONTROL FOR VEHICLES.

1,138,560.  Specification of Letters Patent.  Patented May 4, 1915.

Application filed September 12, 1913. Serial No. 789,576.

*To all whom it may concern:*

Be it known that I, ARMIN G. HELFER, a citizen of the Republic of Switzerland, residing at New York, in the county of New York and State of New York, have invented new and useful Improvements in Automatic Speed Control for Vehicles, of which the following is a specification.

This invention relates to automatic speed control for vehicles and it consists in the novel features hereinafter described and claimed.

An object of the invention is to provide a device of simple structural arrangement adapted to be connected with the magneto and speedometer of an automobile vehicle for the purpose of controlling the current from the magneto whereby the same may be rendered inactive when the machine begins to travel at a certain predetermined rate of speed.

With the above object in view the device comprises a shiftable stop member mounted in the dial casing of the speedometer and which is provided with an angularly disposed end disposed in the path of movement of the indicator finger. The indicator finger is electrically connected by means of a wire or ground connection with the magneto and an electric connection is provided between the magneto and the said stop member. Consequently when the indicator finger comes in contact with the stop member the current from the magneto is short circuited and is automatically cut off from the sparking plugs of the engine of the vehicle. Means is provided for adjusting the said stop member so that the vehicle may be permitted to travel at a certain predetermined rate of speed before the short circuiting of the current from the magneto as above described takes place. The said means is controlled by a detachable key and consequently one having possession of the key may set or position the stop member to limit the rate of speed at which the car may travel.

In the accompanying drawing: Figure 1 is a side elevation of the device. Fig. 2 is an enlarged front view of the dial casing of the speedometer. Fig. 3 is a sectional view of the same. Fig. 4 is an enlarged plan view of the means for moving the stop member. Fig. 5 is a perspective view of the key for controlling said means.

As indicated in the drawing the magneto 1 is of the usual construction and the construction of the dial casing 2 of the speedometer is of the usual pattern. The dial casing 2 is provided with a series of graduations 3 which preferably indicate miles and fractions thereof. A shaft 4 is journaled in the casing 2 and may be turned by a flexible shaft indicated at 5 or other suitable means usually employed for this purpose. The shaft 4 carries a finger 6 the free end of which is adapted to move along the graduations 3 as the said shaft is turned.

A body of insulating material 7 surrounds the shaft 4 but the shaft is free to turn in the said body of material. A worm wheel 8, of insulating material, surrounds the material 7 and is located under the finger 6. A stop member 9 is fixed to the worm wheel 8 and extends out radially from the axis of the shaft 4. The said stop member 9 is provided with an extremity 10 which projects into the path of movement of the free end portion of the finger 6. The inner end of the stop member 9 projects into the insulating material 7 and contacts with a strip 11 embedded in the said material.

Bearings 12 are located in the casing 2 and a worm member 13 is journaled in the said bearings. Said worm member 13 meshes with the worm wheel 8 and the member 13 is provided at one end with an extension having a non-circular extremity 14 which terminates within the casing 2 adjacent an opening 15 provided therein. A key 16 is adapted to be inserted through the opening 15 and engage with the extension and extremity 14 of the worm member 13 whereby the said member may be turned in the bearings 12. As the member 13 is turned the worm wheel 8 is partially rotated whereby the stop member 9 is moved along the graduation 3 so that the said stop member may be disposed toward any particular graduation. After the stop member 9 has been desired at a predetermined position the key 16 may be disengaged from the extremity of the worm wheel 13 whereby the parts will be set so that the finger 6 may move along a limited predetermined path.

A bushing 17 of insulating material surrounds the material 7 and is spaced by the partition 18 of the casing 2 from the worm wheel 8. A washer 19 is secured to the bushing 17 but is spaced from the shaft 4. The washer 19 is of a material which is a good electric conductor and one end of the strip 11, which is of similar material, touches the washer 19 as best illustrated in Fig. 3 of the drawing. A wire 20 is connected at one end with the magneto 1 and passes through the side of the casing 2 and is connected by means of a binding screw 21 with the washer 19. A ground or return wire 22 is connected at one end with the magneto 1 and at its other end is connected in any suitable manner with the shaft 4.

From the above description taken in conjunction with the accompanying drawing it will be seen that when the magneto 1 is in operation and the finger 6 is not in contact with the extremity 10 of the stop member 9 there is no short circuit created through the magneto. However as soon as the speed of the automobile or vehicle is increased to such an extent that the finger 6 encounters the extremity 10 of the stop member 9 the current which passes from the magneto 1 along the wire 20 passes through the washer 19 and along the strip 11 to the stop member 9 thence from the extremity 10 thereof and along the finger 6 to the shaft 4 and from the shaft 4 along the wire 22 back to the magneto. Consequently the current from the magneto is short circuited and is cut off from the sparking plugs of the engine of the automobile. Therefor at such time as the finger 6 encounters the extremity 10 of the member 9 the supply of current to the sparking plugs is interrupted. By setting the stop member 9 toward any particular graduation or unit of the series of graduations 3 the magneto 1 may be caused to interrupt the supply of current to the sparking plugs when the material begins to travel at the rate of speed toward which the member 9 is disposed. Therefore one having possession of the key 16 may set the device so that the car to which it is applied cannot be run at a faster rate of speed than that predetermined.

Having described the invention what is claimed is:—

An indicator comprising a casing, a worm wheel journaled therein, a finger movably mounted, a stop fixed to the worm wheel at the edge thereof and having an end portion lying in the path of movement of the finger, bearings mounted in the casing, a worm journaled in the bearings and engaging the worm wheel at a point opposite the stop, said worm having an extension located within the casing and adapted to be engaged by a key for turning the same, said casing having an opening opposite the end of said extension through which the key may be inserted for engagement with the extension.

In testimony whereof I affix my signature in presence of two witnesses.

ARMIN G. HELFER.

Witnesses:
K. DELABAR,
GEO. A. BYRNE.